US010371328B2

(12) United States Patent
Poage

(10) Patent No.: US 10,371,328 B2
(45) Date of Patent: Aug. 6, 2019

(54) SOLAR POWERED LIGHTING SYSTEM

(71) Applicant: BryCo Solar Systems, LLC, Oklahoma City, OK (US)

(72) Inventor: Bryan Poage, Oklahoma City, OK (US)

(73) Assignee: Bryco Solar Systems, LLC, Oklahoma City, OK (US)

( * ) Notice: Subject to any disclaimer, the term of this patent is extended or adjusted under 35 U.S.C. 154(b) by 0 days.

(21) Appl. No.: 15/971,531

(22) Filed: May 4, 2018

(65) Prior Publication Data

US 2018/0320835 A1 Nov. 8, 2018

Related U.S. Application Data

(60) Provisional application No. 62/501,378, filed on May 4, 2017.

(51) Int. Cl.

| | |
|---|---|
| ***H02S 10/40*** | (2014.01) |
| ***F21L 14/04*** | (2006.01) |
| ***F21V 21/22*** | (2006.01) |
| ***H02S 30/20*** | (2014.01) |
| ***H02S 20/30*** | (2014.01) |
| ***H02S 40/38*** | (2014.01) |
| ***H02J 7/35*** | (2006.01) |
| *F21W 131/402* | (2006.01) |

(Continued)

(52) U.S. Cl.

CPC .............. *F21L 14/04* (2013.01); *F21V 21/22* (2013.01); *H02J 7/35* (2013.01); *H02J 7/355* (2013.01); *H02S 10/40* (2014.12); *H02S 20/30* (2014.12); *H02S 30/20* (2014.12); *H02S 40/38* (2014.12); *F21W 2131/10* (2013.01); *F21W 2131/402* (2013.01); *F21Y 2115/10* (2016.08)

(58) Field of Classification Search

CPC .......... F21L 14/04; H02S 10/40; H02S 20/30; H02S 30/20; H02S 40/38; F21V 21/22; H02J 7/35; F21Y 2115/10; F21W 2131/10; F21W 2131/402

See application file for complete search history.

(56) References Cited

U.S. PATENT DOCUMENTS

| | | | | |
|---|---|---|---|---|
| 5,969,501 | A | 10/1999 | Glidden et al. | |
| 6,889,630 | B1 * | 5/2005 | Wayman .............. | A01K 5/0291 119/57.92 |
| 7,795,837 | B1 | 9/2010 | Haun et al. | |

(Continued)

*Primary Examiner* — Anh T Mai

*Assistant Examiner* — Fatima N Farokhrooz

(74) *Attorney, Agent, or Firm* — Hall Estill Attorneys at Law

(57) ABSTRACT

A portable solar powered illumination system has a housing adapted for transport using at least one pair of wheels coupled to an axle assembly. The housing has a rear facing wall that extends at a selected non-orthogonal angle with respect to a base of the housing. The rear facing wall supports a tri-fold solar panel assembly with first, second and third solar panels. The first solar panel is affixed to the rear facing side wall, and the second and third solar panels hingedly fold onto and away from the first solar panel between retracted and deployed positions. Energy collected by the solar panel assembly is stored by an energy storage device during the day and used by a light assembly for illumination at night. An elevation adjustment device establishes a rotational angle of the housing to maintain the deployed solar panels at a desired angle.

20 Claims, 4 Drawing Sheets

(51) Int. Cl.

| | |
|---|---|
| *F21Y 115/10* | (2016.01) |
| *F21W 131/10* | (2006.01) |

(56) References Cited

U.S. PATENT DOCUMENTS

| | | | | |
|---|---|---|---|---|
| 8,193,760 | B2 | 6/2012 | Wagnon et al. | |
| 8,792,227 | B2 | 7/2014 | Prax et al. | |
| 2011/0179791 | A1* | 7/2011 | Butler | F24J 2/16 60/641.15 |
| 2011/0221203 | A1* | 9/2011 | Miller | F03D 9/007 290/55 |
| 2012/0020084 | A1* | 1/2012 | Romero Lampon | H02S 30/20 362/249.01 |
| 2012/0026320 | A1* | 2/2012 | Bryceland | G08G 5/0026 348/135 |
| 2012/0057281 | A1* | 3/2012 | Lee | H02J 7/355 361/679.01 |
| 2012/0201016 | A1* | 8/2012 | Robertson | F21L 4/08 362/183 |
| 2012/0293111 | A1* | 11/2012 | Sentinelli | H02S 30/20 320/101 |
| 2013/0285595 | A1* | 10/2013 | Eaton, Jr. | H01L 31/042 320/101 |
| 2014/0125134 | A1* | 5/2014 | Van Straten | H02J 7/02 307/72 |
| 2014/0240968 | A1 | 8/2014 | Brown | |
| 2015/0280489 | A1* | 10/2015 | Curlett | H02J 7/14 307/66 |
| 2015/0345939 | A1* | 12/2015 | Salter | H05B 37/0218 356/138 |
| 2018/0212551 | A1* | 7/2018 | Polk | H02S 10/40 |

* cited by examiner

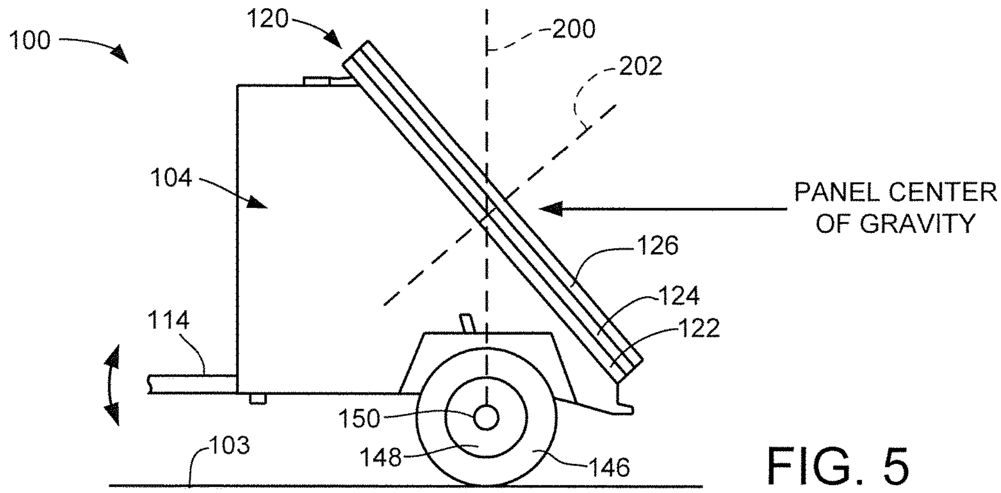
FIG. 5
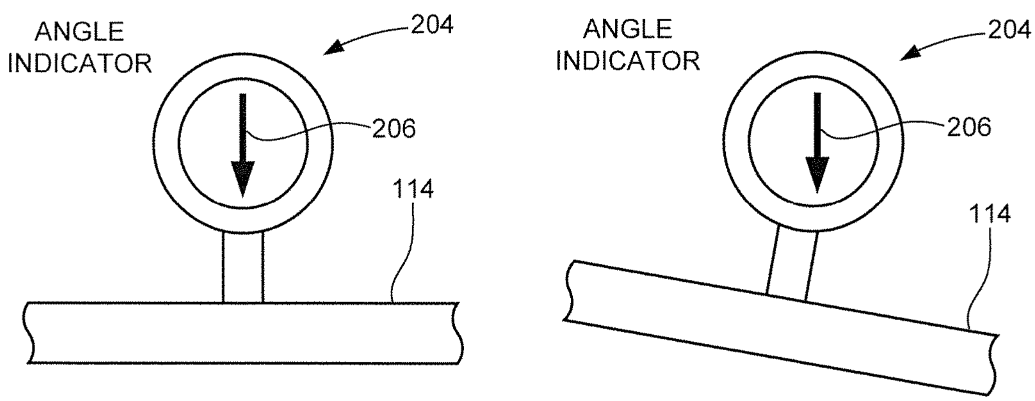
FIG. 6A
FIG. 6B
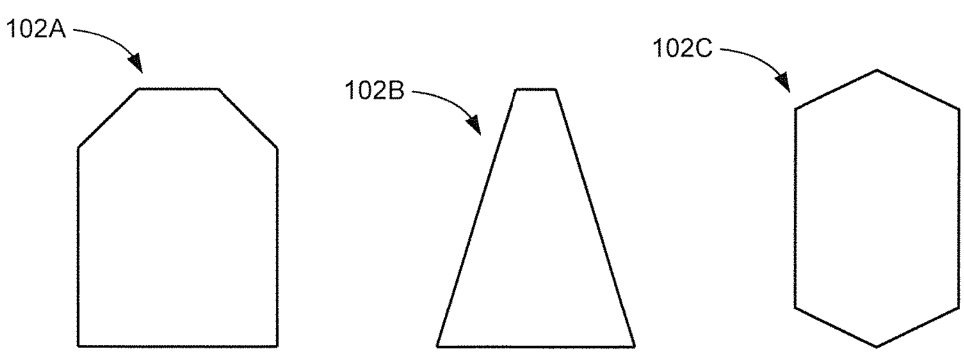
FIG. 7A
FIG. 7B
FIG. 7C

SOLAR POWERED LIGHTING SYSTEM

RELATED APPLICATION

The present application makes a claim of domestic priority to U.S. Provisional Patent Application No. 62/501,378 filed May 4, 2017, the contents of which are hereby incorporated by reference.

BACKGROUND

Outdoor locations can often require the use of a portable lighting system to provide illumination during nighttime hours. In some cases, the locations may be relatively remote, such as oil and gas drilling rigs, highway road construction sites, rural based festivals and concerts, campsites, etc., where electrical power from an existing power grid-based power source may be unavailable or inconveniently accessed.

A portable lighting system may include a retractable tower to raise and lower a high intensity LED or similar electric lamp to provide nighttime illumination over a large area. Other features can be included as well such as video cameras, recording equipment, sensors, communication/uplink modules, etc.

It is common to employ a fossil-fuel (e.g., diesel) powered generator in order to generate the requisite electrical power for a portable lighting system. While operable, portable generators have a number of limitations such as noise, environmental pollution, maintenance, fuel costs and fuel transportation requirements. These and other limitations can be particularly undesirable in remote wilderness areas as well as high traffic construction work zones.

Some more recently proposed designs for portable lighting systems utilize one or more solar energy collection units (solar panels) which are deployed to collect electromagnetic energy from the sun during daylight hours. The collected energy is transduced to provide a flow of electrical current which is used to charge a bank of rechargeable batteries. The batteries are charged during the day and used to power the system during the night and, as required, during the day as well.

While operable, there remains a need for improvements in the manner in which solar power can be used to charge a portable lighting system. It is to these and other improvements that the present disclosure is directed.

SUMMARY

Various embodiments of the present disclosure are generally directed to a portable solar powered lighting system.

Without limitation, some embodiments provide the system as a trailer comprising a trailer base having a front end, a rear end and an intermediate, horizontally extending, planar support portion between the respective front and rear ends. The front end supports a hitch configured for attachment to a vehicle. A trailer axis is coupled to the planar support portion between the front end and the rear end which supports opposing first and second wheels to facilitate towing of the trailer by the vehicle.

An enclosure is supported by the trailer base to provide an interior closed housing for the system. The enclosure has a front facing wall adjacent the front end, a rear facing wall adjacent the rear end, a first side wall between the front and rear facing walls adjacent the first wheel and an opposing second side wall between the front and rear facing walls adjacent the second wheel. The rear facing wall extends at a selected angle non-orthogonal with respect to the planar support portion. The enclosure further has a top cover wall that respectively adjoins a top edge of each of the front and rear facing walls and the first and second side walls.

A multi-panel solar collection assembly is affixed to and supported by the rear facing wall. The assembly includes first, second and third solar panels. The first solar panel is supported by and covers the rear facing wall, the first solar panel having a rectangular shape with a top edge, a bottom edge, a first side edge adjacent the first side wall and a second side edge adjacent the second side wall. The second solar panel is attached, via a first hinge assembly, to the first side edge of the first solar panel. The third solar panel is attached, via a second hinge assembly, to the second side edge of the third solar panel. The second and third solar panels are rotatable with respect to the first solar panel between a deployed state and a retracted state, wherein in the retracted state the second and third solar panels are supported by in facing relation to the first solar panel, and wherein in the deployed state the second and third solar panels are rotated away from and face away from the rear wall.

An energy storage device is housed within the enclosure to store electrical energy collected by the multi-panel solar collection assembly in the deployed state. A light assembly extends from the enclosure having at least one light source powered by the electrical energy stored by the energy storage device. An elevation adjustment device is connected to the hitch configured to support the front end of the trailer. The elevation adjustment device is adjustable to raise or lower the front end and rotate the enclosure about the trailer axis and fixedly maintain the multi-panel solar collection assembly at a selected angle with respect to an underlying base surface that supports the elevation adjustment device.

In related embodiments, the system has a housing supported by at least two opposing wheels fixed to an axle to facilitate movement of the housing across an underlying surface. The housing has a planar base surface and a rear facing support wall that extends at a non-orthogonal angle with respect to the planar base surface.

A solar panel assembly is mounted to the rear facing support wall. The solar panel assembly has a first solar panel affixed to substantially cover the rear facing support wall, a second solar panel configured for hinged movement with respect to a first side of the first solar panel, and a third solar panel configured for hinged movement with respect to an opposing second side of the first solar panel. The second and third solar panels are moveable between a retracted position in which the second solar panel is folded onto and in facing relation with the first solar panel and the third solar panel is folded onto the second solar panel in facing relation with the first solar panel so that the second solar panel is sandwiched between the first and third solar panels.

The system further has an energy storage device configured to store electrical energy collected by the solar panel assembly in the deployed state, a light assembly having at least one light source powered by the electrical energy stored by the energy storage device, and an elevation adjustment device coupled to a front portion of the planar base surface opposite the rear facing wall. The elevation adjustment device is configured to establish a fixed rotational position of the housing with respect to a central axis of the axle assembly and orient the first, second and third solar panels at a selected azimuth.

These and other features and advantages of various embodiments can be understood with a review of the following detailed description in conjunction with the accompanying drawings.

BRIEF DESCRIPTION OF DRAWINGS

FIG. 5 illustrates a location of a center of gravity (COG) of the solar energy collection units relative to other aspects of the system.

FIGS. 6A and 6B show an optional angle indicator gauge that can be used in some embodiments to deploy the system.

FIGS. 7A, 7B and 7C show alternative configurations for a trailer portion of the system in further embodiments.

DETAILED DESCRIPTION

Figure 1:
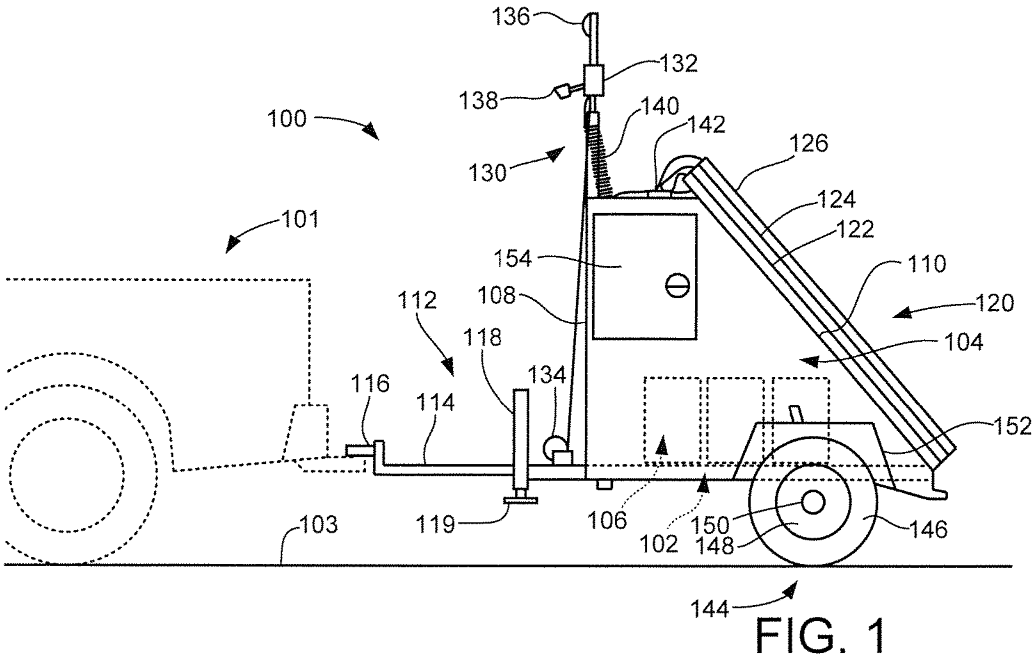
FIG. 1 provides an isometric, side-elevational representation of a portable trailer based lighting system constructed and operated in accordance with some embodiments.

Various embodiments of the present disclosure are generally directed to a portable solar powered lighting system. As explained below, the system is designed to be towed or otherwise transported to a remote location for deployment. Solar panels are used to collect electromagnetic energy during the daytime. The energy is stored by an energy storage device, such as a bank of rechargeable batteries. At night, one or more illumination devices can be powered by the stored energy. Other features, such as communication and surveillance devices, can be operated using the stored energy as well.

Once deployed, the system is designed to operate in a stand-alone fashion and requires little or no human intervention, including automated transition between periods of solar collection and illumination. Depending on the configuration and operational environment, audio and/or video surveillance data can be collected and stored, and data obtained by the system can be transmitted to a server via a wireless data communication network. A rugged construction is used to ensure reliability and long useful life in many different types of terrain.

In some embodiments, the system is configured to have a trailer base with a front end, a rear end and an intermediate, horizontally extending, planar support portion between the respective front and rear ends. The front end of the trailer supports a hitch configured for attachment to a vehicle. A trailer axis is coupled to the planar support portion between the front end and the rear end to support opposing first and second wheels to facilitate towing of the trailer by the vehicle.

A rigid enclosure is supported by the trailer base to provide an interior closed housing for the system. The enclosure includes a front facing wall adjacent the front end of the trailer and a rear facing wall adjacent the rear end of the trailer. The housing is generally triangular shaped in that the front facing wall is substantially vertical and the rear facing wall extends upwardly at a selected angle that is acute with respect to the trailer base, such as from between about 40 degrees to about 60 degrees.

Various electrical components are disposed within the housing, including a bank of rechargeable batteries (or other energy storage device), control circuitry, power regulation circuitry, video display and recording components, cooling fans, lights, etc. A lighting tower may extend from the front facing wall of the trailer and may be raised and lowered between a tower deployed state and a tower retracted state.

A multi-panel solar energy collection assembly is affixed to and supported by the rear facing wall at the selected angle of the rear facing wall. The solar energy collection assembly includes first, second and third solar panels that can be transitioned between a panel retracted state and a panel deployed state.

The first solar panel is supported by and covers the rear facing wall and has a substantially rectangular shape. The second solar panel is hinged to a first edge of the first solar panel, and the third solar panel is hinged to an opposing, second edge of the first solar panel. The respective panels are arranged to be folded one atop the other in a tri-fold configuration so that all three panels are parallel and adjacent in the retracted state. Suitable locking mechanisms are provided to maintain the panels in the retracted state during transport.

The second and third panels may be respectively unfolded out to transition to the deployed state. The second and third panels may be unfolded completely so that all three panels may be adjacently planar so as to form a contiguous flat collection area. Alternatively, one or both of the second and third panels may be supported at an angle with respect to the first panel using one or more support struts. The lengths of the struts may be adjustable to provide different respective angles between the panels.

Energy is collected by the panels from the impingement of electromagnetic radiation from the sun during daylight hours while the panels are in the deployed state. The energy is converted to current which is fed to the electrical batteries, which in turn supply electrical power to the remaining electrical components of the system, including to the light during nighttime hours. A photoelectric sensitive device on a top of the trailer housing can be used to detect the transition from daytime to nighttime, resulting in the automatic transition from an energy collection state (during which the solar panels are active) to an illumination state (in which the light is activated) and back again.

Because the solar panels are disposed across the rear facing wall of the trailer parallel to the axis about which the wheels rotate, an elevation adjustment device connected to the hitch can be used to support the front end of the trailer, as well as to provide elevational adjustments to raise or lower the front end of the trailer relative to the ground. As the trailer rotates about the wheel axis, the panels can be adjusted to an optimum angle with respect to horizontal to accommodate different latitudes as well as differences in the track of the sun during summer versus winter months. It is contemplated that the trailer will be arranged so that the panels are facing due south for maximum solar collection. In this orientation, the left-most panel (the panel on the west side) can be oriented at a suitable angle with respect to the middle panel to face generally eastward and enhance collection of sun light from the early morning sun.

These and other features will become apparent with a review of the drawings, beginning with FIG. 1 which is an isometric, side-elevational depiction of a portable trailer based lighting system 100 in accordance with some embodiments. Other configurations may be used as desired consistent with the present discussion. The system 100 is configured as a trailer to be towed behind a suitable motor vehicle such as a truck 101. In this configuration, both the system 100 and truck 101 are supported by an underlying base surface (e.g., ground) 103.

The system 100 has an interior structural frame that includes a horizontal trailer base 102 (shown in general dotted line fashion) to provide a base structure for the trailer. The trailer base 102 is substantially rectangular in the embodiment of FIG. 1, but other shapes and configurations can be used as desired. The trailer base 102 supports an enclosed housing 104 that encloses and seals various elements of interest, including one or more energy storage devices (e.g., batteries) 106. The housing 104 includes a front facing wall 108 that extends nominally vertically, and a rear facing wall 110 that is canted at a suitable angle with respect to the horizontal base 102, such as between about 40 degrees and about 60 degrees. In one embodiment, the angle is about 50 degrees.

A hitch assembly 112 extends from the front end of the base 102 and includes an elongated hitch arm 114 which terminates in a hitch 116 for attachment to the vehicle. An adjustable support 118 has a foot pad 119 that can be raised and lowered using a user operated mechanism. In the lowered position (see FIG. 2), the foot pad 119 provides stability to the trailer system 100 by resting on a base surface (e.g., the ground).

A solar energy collection assembly 120 is supported by the rear facing wall 110 with three hinged solar panels 122, 124 and 126. Deployment of the panels is discussed below. Operation of the panels during daylight hours results in transfer of charge to the batteries 106.

Figure 3:
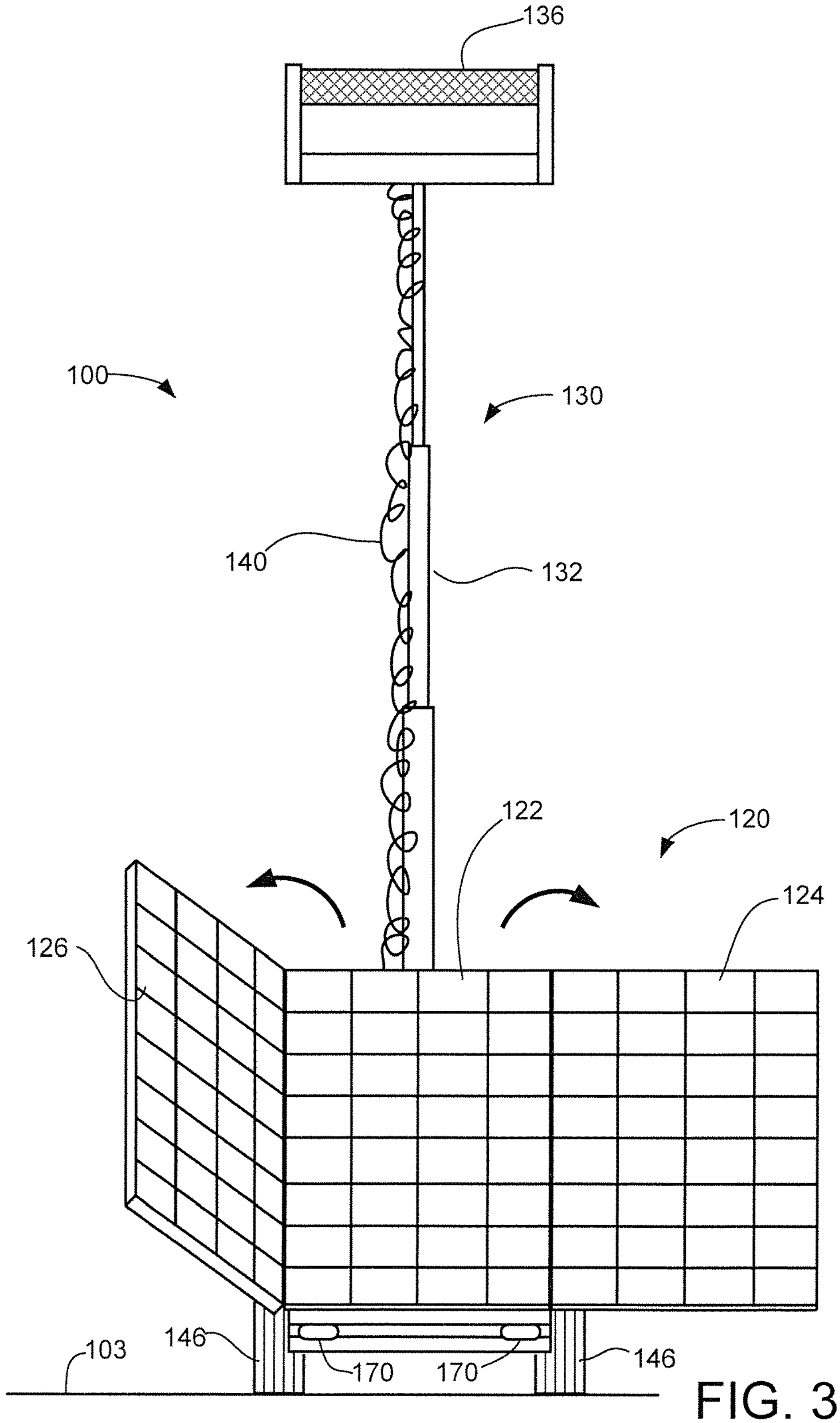
FIG. 3 is an isometric, rear-elevational representation of the panel deployed system of FIG. 2 with a lighting tower in a tower deployed state.

A tower assembly 130 includes a telescopic light tower 132 that can be raised and lowered by a user activated winch 134 between a retracted position (FIG. 1) and a deployed position (FIG. 3). A high intensity LED light 136 is configured to provide nighttime illumination. A suitable size may be a 50,000 lumen light, although other sizes and configurations may be used. As desired, a surveillance camera 138 may project forward from the tower 132. A coiled power cord 140 provides electrical and data interconnections for the tower. A photoelectric cell or other light detecting device 142 may be disposed on a top portion of the housing 104 to enable automated dusk-dawn switching between charging and illumination functions.

The trailer system 100 is supported by a pair of opposing wheel assemblies 144 (wheels), such as trailer/motor vehicle type tires 146 and hubs 148 which rotate about a central (trailer) axis of a trailer axle assembly 150. Wheel housings (fenders) 152 extend from the housing 104 to partially enclose the wheels. A unitary axle is contemplated that extends from the first wheel to the second wheel, but the trailer axle assembly 150 can take other configurations such as separate axle members that respectively support the first and second wheels and which are aligned along a trailer axis.

A lockable access door 154 in the side of the housing 104 provides access to various electrical components disposed within the housing, as described more fully below. A similar lockable compartment may be provided on the opposing side of the trailer housing 104.

Figure 2:
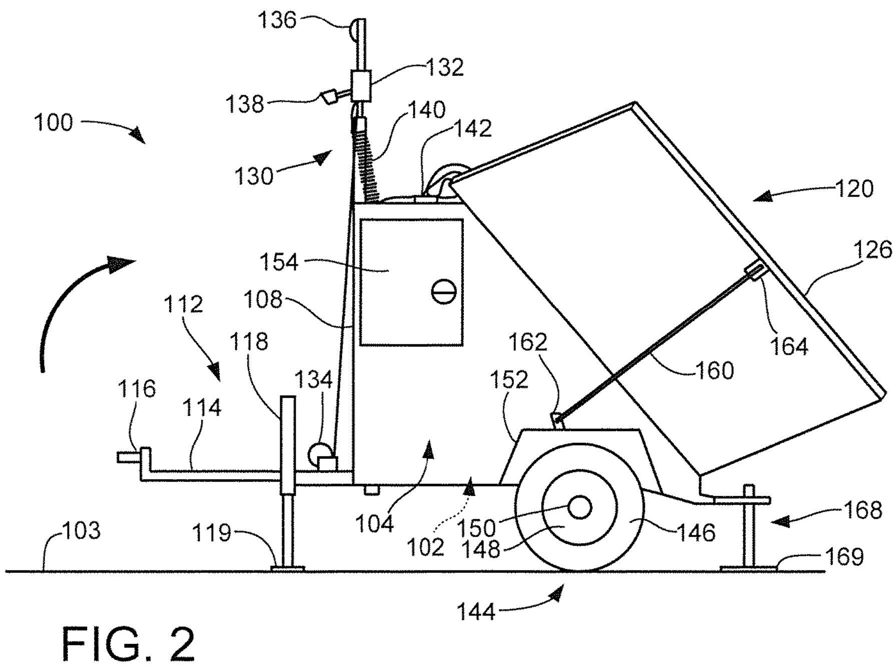
FIG. 2 shows the system of FIG. 1 with solar energy collection units (solar panels) in a panel deployed state.

FIG. 2 shows the system 100 in a deployed position. The respective solar panels 122, 124 and 126 are arranged with suitable hinge and support features (not separately designated) to enable a tri-fold arrangement, so that the outer panels 124, 126 (also referred to as the "second and third panels") are hinged to the respective opposing edges of the central panel 122 (also referred to as the "first panel"), which remains stationary and affixed to the rear wall 110.

In FIG. 2, the third panel 126 is rotated out and supported by a support strut 160, which attaches between a fender support 162 on the fender 152 and a panel support 164 on the back side of the panel 126. In some cases, the strut 160 is telescopic or otherwise adjustable to different lengths to enable the relative angle of the panel to be set to one of various different angles. Corresponding adjustments for the second panel 124 can be made using a similar strut and supports on the other side of the trailer.

It will be noted that the orientation of FIG. 2 has the third panel 126 extending at an angle of about 60 degrees with respect to the central panel 122 (see FIG. 3). If the trailer system 100 is facing south in this configuration, the third panel 126 will be facing in a generally eastward direction, suitable to collect sunlight from the early morning sun and extend the time (and overall energy collection) obtained by the system during a given day.

The foot pad 119 of support mechanism 118 is shown to be deployed on the ground in FIG. 2. As desired, the distance of deployment of the foot pad can be adjusted to induce rotational adjustments in the overall angular orientation of the trailer. This can allow fine-tuning adjustments in the angle of the deployed solar panels as the trailer is rotated about the trailer axis of axle 150.

Depending on latitude, an angle of about 56 degrees with respect to horizontal may be a suitable orientation to maximize solar collection during winter months and an angle of about 52 degrees may be a suitable orientation for summer months due to differences of the relative "height" or azimuth of the sun. A base amount of elevation angle for the panels can be established by the angle of the rear wall 110, and then fine adjustments of 0-15 degrees or so can be imparted using the mechanism 118 and foot pad 119. As desired, optional rear support mechanisms 168 can be deployed from each rear corner of the trailer. The support mechanisms can each include an extendable foot pad 169 to add further stability to the deployed trailer.

FIG. 3 shows a rear view of the system 100 as arranged in FIG. 2, except that the lighting tower 132 has been fully deployed, which uncoils the coiled communication line 140. Brake lights 170 are depicted along the rear edge of the trailer system 100.

Figure 4:
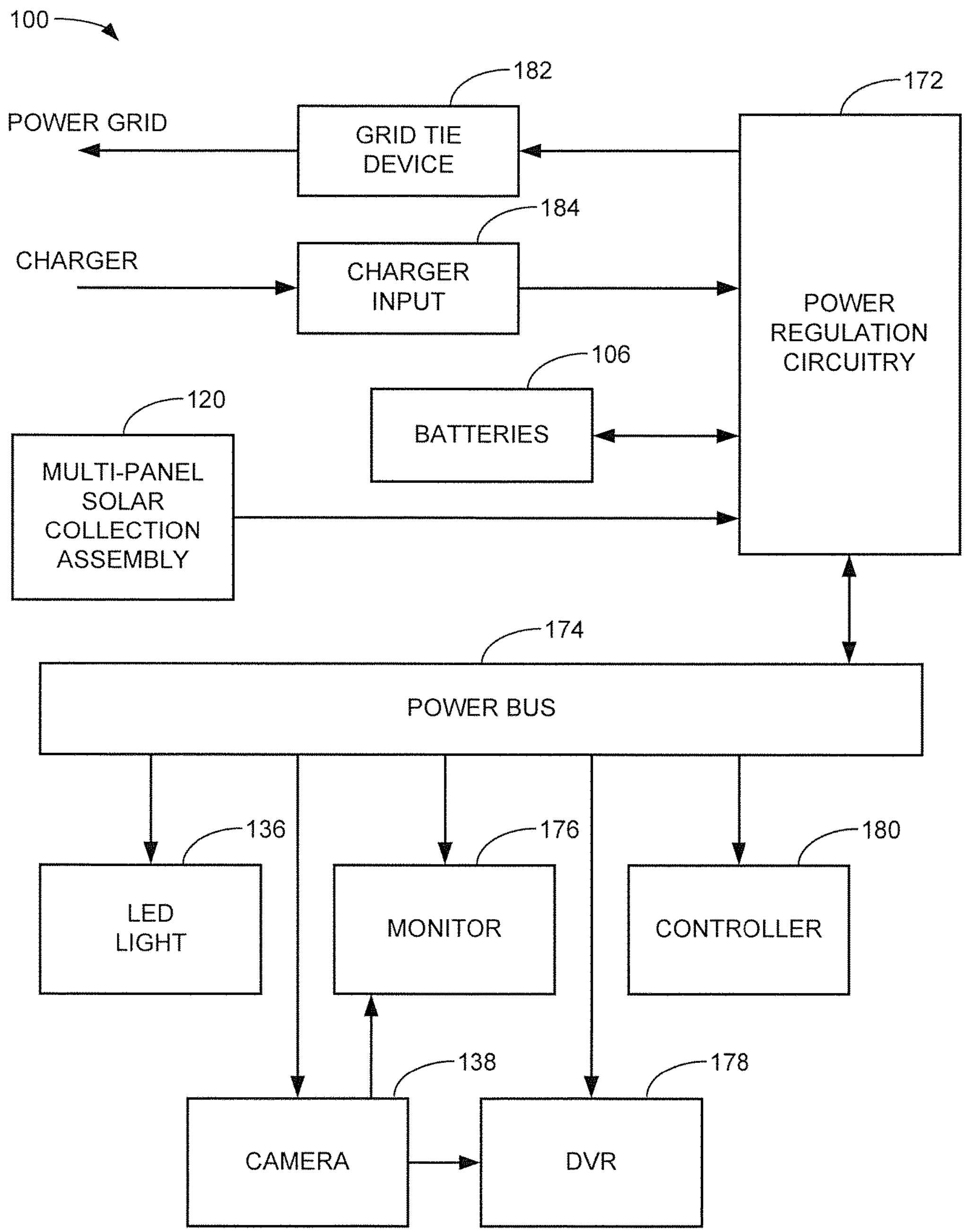
FIG. 4 is a functional block representation of various electrical elements of the system.

FIG. 4 is a functional block representation of various electrical and electronic components of the system 100. The arrangement is FIG. 4 is merely for purposes of illustration and is not limiting, as other arrangements can be used, including arrangements that omit one or more of the illustrated components and arrangements that include additional components.

Generally, as described above the deployed panels 122, 124 and 126 of the multi-panel solar collection assembly 120 charge the batteries 106 using a power regulation circuit block 172, which includes various suitable elements including voltage regulators, voltage converters, switches, protection devices, etc. It is contemplated albeit not required that the panels collectively generate a steady state charge of about 50 amps at 36 volts. This voltage may be maintained at the battery, or this value may be stepped down (or up) as required.

Power is distributed from the batteries 106 using a power bus 174, which in turn supplies various internal loads of the system 100 including the LED light 136 and the camera 138 discussed above. Additionally, a computer monitor 176 may be supplied within the housing 104 to display an output of the camera, and a digital video recorder (DVR) 178 may maintain a recording of recent camera frame sequences. A controller 180, which may take the form of a programmable processor and associated memory, provides top level control for the system.

In some embodiments a grid tie device 182 can be used to support cogeneration efforts by transferring power generated and/or stored by the system into an existing power grid. A charger input device 184 can be used to provide a rapid charge of the batteries 106 in situations where inclement weather (clouds, rain, etc.) prevent efficient charging by the panels. It is contemplated that a fully charged set of the batteries can provide up to or exceeding four (4) consecutive nights of illumination and auxiliary power for the system. Should charging be required via the charger input block 184, a power grid or portable generator may be used.

Other operative elements may be incorporated into and/or powered by the system, including lights, fans, network communication equipment, relays, HVAC systems, power tools, etc. Various sensors can be incorporated into the system and/or powered by the system including motion sensors, audio sensors, environmental sensors, electromagnetic (e.g., infrared, wireless communication, etc.) sensors, etc.

FIG. 5 illustrates the relative placement of various features of the system 100 to enhance balance, maneuverability and alignment. A vertical dotted line 200 extends upwardly from the center of the trailer axis along axle 150. An angled dotted line 202 represents the midline, or nominal center, of the multi-panel solar collection assembly 120. Because the respective panels 122, 124 and 126 are largely uniform in mass across the respective lengths and widths thereof, the intersection of the respective lines 200, 202 is adjacent the center of gravity (COG) of the panel assembly 120. In other words, the COG of the panel assembly is nominally disposed over the trailer axis.

This placement of the panels relative to the axis enables accurate and precise rotational alignment of the panels as the hitch arm 114 is raised and lowered. As desired, an angle indicator gauge 204 can be mounted to the hitch arm 114 (or other suitable location), as shown in FIG. 6A.

The gauge 204 has an indicator 206 that points downwardly irrespective of the orientation of the hitch arm 114, as represented in FIG. 6B. Suitable indicia can be supplied to the gauge 204 (not shown) to provide an accurate indication of the angle of the panel assembly 120 based on the raising and lowering of the hitch arm. Other forms of angle indication gauges can be used as desired to indicate the angle of the panels.

FIGS. 7A-7C show different alternative shapes for the trailer base 102. As noted above, a rectangular base is particularly suitable in some configurations. However, any number of different trailer base shapes can be supplied including a tapered configuration 102A, a substantially triangular configuration 102B and a hexagonal configuration 102C. Other shapes, including curvilinear shapes, may be used as well, so long as the trailer facilitates the arrangement, support and deployment of the panels 122, 124 and 126 as discussed above.

While the system 100 is primarily configured to provide illumination in a remote location, the system can readily be adapted to additionally or alternatively provide other features including geological/ecological/climate monitoring and reporting, emergency response power support, etc. The system is designed to be placed in a stationary position (e.g., on the ground) but it can be readily adapted for operation on a mobile transport platform (e.g., a ship, a railroad car, etc.). The lightweight, balanced configuration allows the system to be easily manipulated by hand to provide the desired alignment with the input solar energy.

While various embodiments have configured the system for towing behind a vehicle, it will be appreciated that other configurations can be used as well such as portable units that can be transported on the back of a truck bed, etc. The housing of the unit can be advantageously sealed against the elements as described above, but this is not necessarily required; the housing can be an open frame housing with suitable protection supplied to the operative components disposed within as required. A sky hook or similar arrangement can be used to support the system by a crane or other lifting mechanism when not in use to prevent theft, vandalism, etc.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A portable solar powered illumination system comprising: a trailer comprising a trailer base having a front end, a rear end and an intermediate, horizontally extending, planar support portion between the respective front and rear ends, the front end supporting a hitch configured for attachment to a vehicle, and a trailer axle assembly coupled to the planar support portion between the front end and the rear end which supports opposing first and second wheels to facilitate towing of the trailer by the vehicle, the trailer axle assembly rotatable about a trailer axis, wherein the trailer is characterized as a two-wheel trailer so that the trailer is supported only by the first and second wheels and the hitch when towed by the vehicle; an enclosure supported by the trailer base to provide an interior closed housing for the system, the enclosure comprising a front facing wall adjacent the front end, a rear facing wall adjacent the rear end, a first side wall between the front and rear facing walls adjacent the first wheel and an opposing second side wall between the front and rear facing walls adjacent the second wheel, the rear facing wall extending at a first selected angle of from between 40 and 60 degrees with respect to the planar support portion and disposed at a far end of the trailer opposite the hitch, the enclosure further comprising a top cover wall that respectively adjoins a top edge of each of the front and rear facing walls and the first and second side walls; a multi-panel solar collection assembly affixed to and supported by the rear facing wall, comprising: a first solar panel supported by and covering the rear facing wall, the first solar panel having a rectangular shape with a top edge, a bottom edge, a first side edge adjacent the first side wall and a second side edge adjacent the second side wall; a second solar panel attached, via a first hinge assembly, to the first side edge of the first solar panel; and a third solar panel attached, via a second hinge assembly, to the second side edge of the third solar panel, the second and third solar panels rotatable with respect to the first solar panel between a deployed state and a retracted state, wherein, in the retracted state, the second and third solar panels are supported in facing relation to the first solar panel, each of the first, second and third solar panels are at the first selected angle of from 40 to 60 degrees with respect to the planar first portion, and each if the first, second and third solar panels are supported by the rear facing wall at the far end of the trailer opposite the hitch, and wherein, in the deployed state, the second and third solar panels are rotated away from and face away from the rear facing wall, the first, second and third solar panels having a center of gravity (COG) in the retracted position that is nominally vertically disposed above the trailer axis about which the first and second wheels rotate; an energy storage device housed within the enclosure to store electrical energy collected by the multi-panel solar collection assembly in the deployed state; a light assembly which extends from the enclosure having at least one light source powered by the electrical energy stored by the energy storage device; and an elevation adjustment device connected to the hitch configured to support the front end of the trailer, the elevation adjustment device adjustable to raise or lower the front end to rotate the enclosure about the trailer axis and the first and second wheels and fixedly maintain the multi-panel solar collection assembly at a second selected angle with respect to an underlying base surface that supports the elevation adjustment device.

2. The system of claim 1, wherein the selected angle of the rear facing wall is between about 40 degrees and about 60 degrees with respect to the planar support portion.

3. The system of claim 1, further comprising a first wheel fender attached to the trailer base to cover a top portion of the first wheel, and a second wheel fender attached to the trailer base to cover a top portion of the second wheel.

4. The system of claim 1, wherein electrical energy is stored by the energy storage device from the multi-panel solar collection assembly during a charging state, wherein the light assembly illuminates a surrounding area adjacent the system using the stored electrical energy during an illumination state, and wherein the system further comprises a photoelectric detector device configured to switch between the charging state and the illumination state responsive to a detection or absence of ambient light.

5. The system of claim 1, further comprising a surveillance camera configured to obtain video data from a surrounding area adjacent the system, the camera supplied with electrical energy stored by the energy storage device.

6. The system of claim 1, further comprising a power grid tie mechanism to interconnect the system with a separate electrical grid.

7. The system of claim 1, further comprising an elongated hitch arm that extends from the front end to support the hitch, and an angle indicator gauge coupled to the hitch arm to provide an indication of a relative angle of the first, second and third solar panels in a vertical direction with respect to an underlying base support surface on which the system rests while the first, second and third solar panels are in the retracted position.

8. The system of claim 1, wherein the light assembly further comprises a tower which supports the at least one light source at a selected elevation above the enclosure.

9. The system of claim 3, further comprising a first strut configured to extend from the first wheel fender to a back surface of the second solar panel to maintain the second panel at a first panel angle with respect to the first solar panel.

10. The system of claim 9, further comprising a second strut configured to extend from the second wheel fender to a back surface of the third solar panel to maintain the third panel at a second panel angle with respect to the first solar panel, wherein the first and second struts are adjustable in length to accommodate a range of angle values for the first and second panel angles.

11. The system of claim 8, wherein the tower is telescopic to facilitate different elevational heights for the at least one light source.

12. A portable solar powered illumination system comprising: a housing supported by first and second wheels fixed to an axle assembly to facilitate movement of the housing across an underlying surface, the housing having a planar base surface and a rear facing support wall that extends at a non-orthogonal first angle of from 40 to 60 degrees with respect to the planar base surface, the planar base surface characterized as a trailer with a forward projecting hitch, the rear facing support wall disposed at a far end of the trailer opposite the hitch, the trailer characterized as a two-wheel trailer configured to be towed by a vehicle using the hitch so that the trailer is supported during such towing solely by the first and second wheels and the hitch; a solar panel assembly mounted to the rear facing support wall, the solar panel assembly comprising a first solar panel affixed to substantially cover the rear facing support wall, a second solar panel configured for hinged movement with respect to a first side of the first solar panel, and a third solar panel configured for hinged movement with respect to an opposing second side of the first solar panel, the second and third solar panels moveable between a retracted position in which the second solar panel is folded onto and in facing relation with the first solar panel and the third solar panel is folded onto the second solar panel in facing relation with the first solar panel so that the second solar panel is sandwiched between the first and third solar panels and each of the first second and third solar panels extending at the first angle of from 40 to 60 degrees with respect to the planar base surface, a center of gravity (COG) of the first, second and third solar panels in the retracted position nominally aligned in a vertical direction over the trailer axis; an energy storage device configured to store electrical energy collected by the solar panel assembly in the deployed state; a light assembly having at least one light source powered by the electrical energy stored by the energy storage device; and an elevation adjustment device coupled to a front portion of the planar base surface opposite the rear facing wall and configured to establish a fixed rotational position of the housing with respect to a central axis of the axle assembly and orient the first, second and third solar panels at a selected azimuth, the elevation adjustment device facilitating a fine adjustment in an angular orientation of the first solar panel and the rear facing support wall to a second angle different from the first angle with respect to the sun by inducing rotation of the trailer about an axis of the axle assembly while the first and second wheels are in a stationary position, the axis of the axle assembly being that about which the first and second wheels rotate during said towing of the trailer.

13. The system of claim 12, further comprising a first wheel fender attached to a first side of the housing to cover a top portion of the first wheel, a second wheel fender attached to an opposing second side of the housing to cover a top portion of the second wheel, a first strut configured to extend from the first wheel fender to a back surface of the second solar panel to maintain the second panel at a first panel angle with respect to the first solar panel, and a second strut configured to extend from the second wheel fender to a back surface of the third solar panel to maintain the third panel at a second panel angle with respect to the first solar panel.

14. The system of claim 12, wherein electrical energy is stored by the energy storage device from the solar panel assembly during a charging state, wherein the light assembly illuminates a surrounding area adjacent the system using the stored electrical energy during an illumination state, and wherein the system further comprises a photoelectric detector device configured to switch between the charging state and the illumination state responsive to a detection or absence of ambient light.

15. The system of claim 12, further comprising a surveillance camera configured to obtain video data from a surrounding area adjacent the system, the camera supplied with electrical energy stored by the energy storage device.

16. The system of claim 12, further comprising a vertical angle gauge coupled to the planar base surface adjacent the elevation adjustment device configured to provide an indication of changes in the angle of the first solar panel with respect to a base surface on which the first and second wheels rest as the trailer is rotated about the axis of the axle assembly and the first and second wheels remain in a stationary position.

17. The system of claim 12, further comprising an elongated hitch arm that extends from a front end of the planar base surface opposite the rear facing wall to support a hitch adapted to be coupled to a motor vehicle, the elevation adjustment device comprising a stand that adjustably establishes a relative angle of the hitch arm with respect to an underlying support surface to in turn establish an angle of the first, second and third solar panels.

18. The system of claim 12, wherein the at least one light source comprises at least one light emitting diode (LED).

19. A method comprising: towing a portable solar powered illumination system to a selected location using a vehicle, the portable solar powered illumination system comprising: a trailer having a trailer base having a front end, a rear end and an intermediate, horizontally extending, planar support portion between the respective front and rear ends, the front end supporting a hitch configured for attachment to the vehicle, and a trailer axle assembly coupled to the planar support portion between the front end and the rear end which supports opposing first and second wheels to facilitate towing of the trailer by the vehicle, the trailer axle assembly rotatable about a trailer axis, wherein the trailer is characterized as only having two wheels so that the trailer is supported only by the first and second wheels and the hitch when towed by the vehicle; an enclosure supported by the trailer base to provide an interior closed housing for the system, the enclosure comprising a front facing wall adjacent the front end of the trailer adjacent to and in facing relation toward the hitch, a rear facing wall adjacent the rear end of the trailer opposite to and in facing relation away from the hitch, a first side wall between the front and rear facing walls adjacent the first wheel and an opposing second side wall between the front and rear facing walls adjacent the second wheel, the rear facing wall extending at a first selected angle of from 40 to 60 degrees with respect to the planar support portion, the enclosure further comprising a top cover wall that respectively adjoins a top edge of each of the front and rear facing walls and the first and second side walls; a multi-panel solar collection assembly affixed to and supported by the rear facing wall, comprising: a first solar panel supported by and covering the rear facing wall, the first solar panel having a rectangular shape with a top edge, a bottom edge, a first side edge adjacent the first side wall and a second side edge adjacent the second side wall; a second solar panel attached, via a first hinge assembly, to the first side edge of the first solar panel; and a third solar panel attached, via a second hinge assembly, to the second side edge of the third solar panel, the second and third solar panels rotatable with respect to the first solar panel between a deployed state and a retracted state, wherein in the retracted state the second and third solar panels are supported by and in facing relation to the first solar panel so that each of the first, second and third solar panels is at the first selected angle of from 40 to 60 degrees with respect to the planar support portion and the first, second and third solar panels are adjacent the rear end of the trailer opposite to and in facing relation away from the hitch, and wherein in the deployed state the second and third solar panels are rotated away from and face away from the rear wall, the first, second and third solar panels having a center of gravity (COG) in the retracted position that is nominally vertically disposed above the trailer axis about which the first and second wheels rotate; an energy storage device housed within the enclosure to store electrical energy collected by the multi-panel solar collection assembly in the deployed state; a light assembly which extends from the enclosure having at least one light source powered by the electrical energy stored by the energy storage device; and an elevation adjustment device connected to the hitch configured to support the front end of the trailer; and rotating the enclosure about the trailer axis by raising or lowering the front end of the trailer to rotate the trailer about the first and second wheels while the first and second wheels are in a stationary position to place the multi-panel solar collection assembly at a second selected angle with respect to an underlying base surface; and fixedly maintaining the multi-panel solar collection assembly at the second selected angle using the elevation adjustment device.

20. The method of claim 19, further comprising using an angle gauge coupled to the hitch to detect the selected angle during the rotating step.

* * * * *